Dec. 12, 1950 V. H. PATRIARCHE 2,533,951
SHOCK ABSORBING AIRCRAFT SKID
Filed Sept. 11, 1946
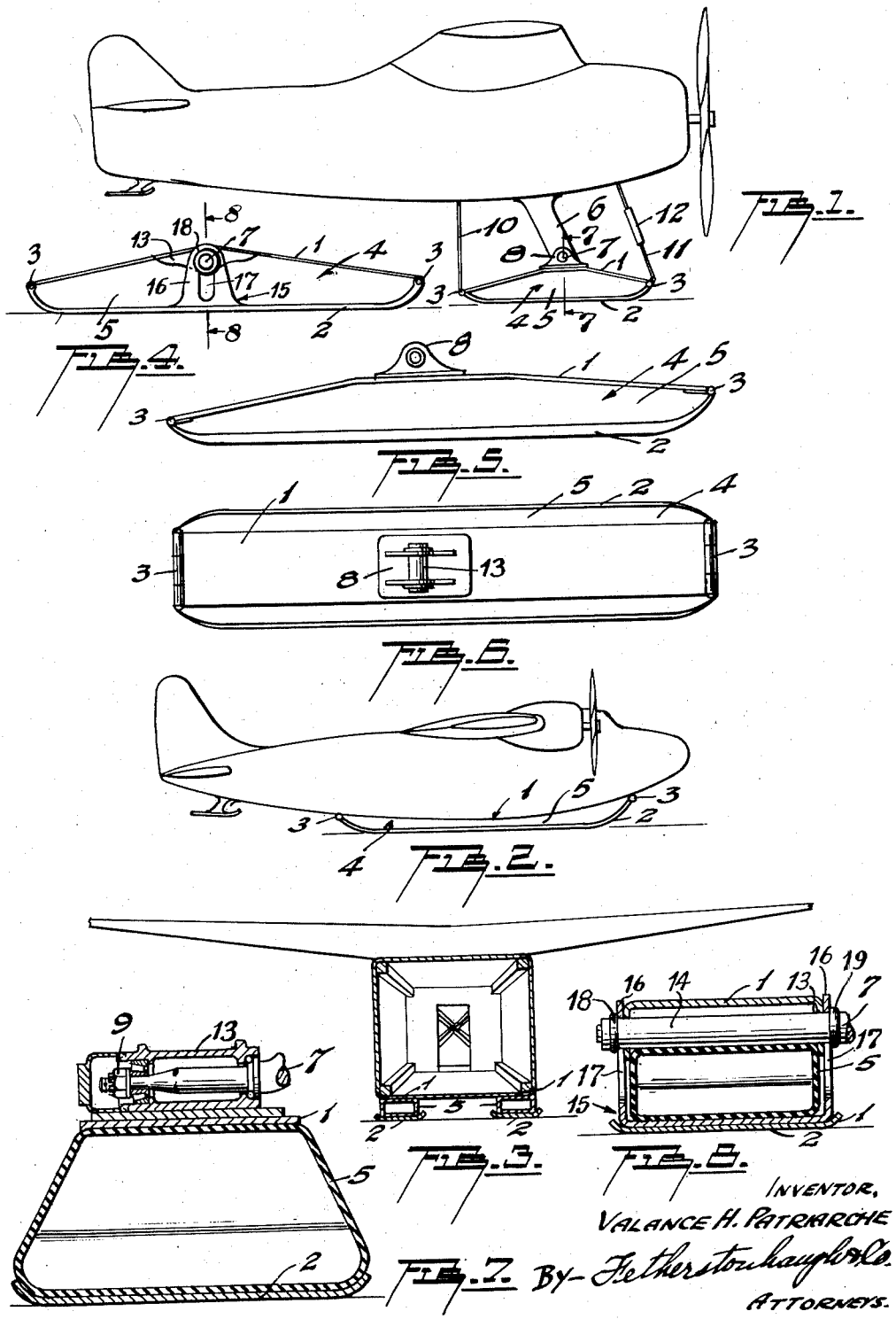
INVENTOR,
VALANCE H. PATRIARCHE
By Fetherstonhaugh & Co.
ATTORNEYS.

Patented Dec. 12, 1950

2,533,951

UNITED STATES PATENT OFFICE 2,533,951

SHOCK ABSORBING AIRCRAFT SKID

Valance Heath Patriarche, Ottawa, Ontario, Canada

Application September 11, 1946, Serial No. 696,321

3 Claims. (Cl. 244—108)

This invention relates to skid type aircraft landing gear.

Previous types of aircraft skids have consisted essentially of a ski-shaped member either attached directly to the bottom of an aircraft or to a landing gear frame. These all have the disadvantage either that no shock absorbing means are provided, particularly where the skids are directly attached to the fuselage bottom, or where shock absorbing means are provided the load is transmitted only to the centre portion of the skid, tending to create uneven wear on the skid surface and causing very high local stresses in the material of the skid near its centre sometimes leading to failure.

It is the object of this invention to provide a skid type aircraft landing gear in which the load is transmitted in substantially uniform manner to the parts of the skid in contact with a landing surface.

It is also the object of the invention to provide a skid type landing gear which is shock absorbing in character.

It is a further object of the invention to provide a skid type aircraft landing gear which is substantially streamlined in shape.

Various other objects and advantages of the invention will be apparent from the following specification.

The present invention accomplishes the above objects by providing a shock absorbing skid in which the load is evenly distributed by pneumatic means to all parts of the skid surface, thus lowering the unit stress on any given portion of the skid and at the same time providing the same type of shock absorbing qualities which are provided by a balloon tire. Skids according to the present invention have the further advantage that better airfoil design of the undercarriage is possible than has ever heretofore been possible with conventional skid type landing gears.

In order to reduce drag, previous aircraft skids have utilized large streamlined hoods housing the struts and shock absorbers. These hoods have had to be removed for servicing the shock absorbers, and besides being a nuisance on this account, also added unnecessary weight to the aircraft. The present skid needs no additional shock absorber since it is itself shock absorbing in character, and since its general shape is streamlined, in most cases no additional fairings are needed. Hence by using skids as herein described, both the weight and drag of the undercarriage are materially reduced and a more efficient general performance of the aircraft is obtainable.

According to the invention, the pneumatic means provided preferably consist of one or more air bags placed between the bottom member of the skid and the member which transmits the load to the landing gear. This member may be a standard landing gear wheel spindle or stub axle mounted in an axle hub secured to a bracket which is mounted on the top chord member which may itself be either rigid or flexible depending on the degree of shock absorbing qualities desired, or where the skid is directly attached to the bottom of the fuselage as is the case with load carrying gliders or high wing aircraft, it may be a specially reinforced section of the fuselage itself.

Several embodiments of the present invention are illustrated by the accompanying drawings, in which Figure 1 is a side view of an aircraft fitted with skids according to the invention mounted on conventional type of landing gear;

Figure 2 shows another embodiment of the invention mounted on a high winged cargo aircraft;

Figure 3 is a sectional front view of a further embodiment of the invention mounted on a cargo glider;

Figure 4 is a side view of a further embodiment of the invention adapted for use as in Figure 1, while Figure 5 is a side elevation of the skid shown in Figure 1;

Figure 6 is a plan view of the skid shown in Figure 5, while

Figure 7 shows a sectional view of the same skid taken along section 7—7 in Figure 1;

Figure 8 is a sectional view of the skid shown in Figure 4 taken along section 8—8.

A skid according to the invention consists principally in a top chord member 1 and a bottom chord member 2 hinged to each other at either end 3, and a space 4 between them which is filled with one or more air bags, or other pneumatic means 5 for distributing the load evenly on the bottom chord member 2. The main idea of the invention, that is, the even distribution of the load to the bottom of the skid, lends itself to various types of embodiment, depending on the type of aircraft, and style of undercarriage on which the skid is to be fitted. In Fig. 1, for instance, the skid is shown mounted on a light high wing aircraft of the type that is currently employed in Northern Canada. In this case, the conventional type of undercarriage usually consists of a single streamlined strut 6 having an axle spindle 7 at its lower end, and usually incorporating some type of shock absorbing means (not shown). The skid is attached to the undercarriage by means of an axle housing bracket 8 situated on the top chord member 1 in one of the manners shown, and provided with an axle hub 13 adapted to fit the axle spindle 7, and be retained thereon, for instance by a locking nut 9. In order to hold the skid firmly in position trimming wires 10 and 11 are used at the front and rear respectively of each skid. Usually the front trimming wire 10 has a stretchable part 12 which acts in a shock absorbing capacity and allows a slight rotation of the skid about the axle spindle 7 to allow the skid to lie substantially flat on the landing surface when the aircraft is in both the normal and "tail-up" taxiing positions.

In the embodiment shown in Fig. 2, the top chord member 1 is a strengthened portion of the fuselage of the aircraft. In this case it is possible to use only one wide skid but usually where the fuselage is wide enough to permit it, a pair of skids such as shown in Fig. 3 will lead to better lateral stability on the ground.

In the embodiment shown in Figure 3 two skids are attached directly to the bottom of the cargo glider fuselage, but the arrangement differs from that shown in Figure 2 in that the skids are themselves complete with top and bottom chord members, and they are secured to the bottom of the glider fuselage in any known manner so that they may be removed, or replaced by some other form of landing gear without requiring the use of servicing facilities not normally available at an air port.

In the embodiment shown in Figures 4 and 8 the top chord member has formed thereon integral members which are bent downwardly at right angles to form lugs 13 which are adapted to support axle hub 14. The bottom chord 2 has secured thereon U-shaped member 15. The legs 16 of said member are positioned so that they extend upwardly at right angles to the bottom plane of the chord member 2 and are spaced apart so as to permit the top chord 1 and the integral lugs to slide freely therebetween. Each of the legs 16 is provided with a slot 17 through which passes freely in sliding engagement the extremities of hub 14 where it is held against transverse displacement by collars 18 and 19.

While the invention is intended primarily for use as a ski for landing on snow surfaces it will be appreciated that it is also capable of use on land, particularly where short landing runs are desired. It is anticipated that with rocket assisted take off, and landing skids according to the invention it will be possible for heavy cargo aircraft to land and take off on smaller and rougher airports than is presently possible.

What I claim as my invention is:

1. A landing skid for aircraft having undercarriage means including a stub axle comprising a substantially flat resiliently flexible skid member upturned at both ends, a flexible top chord member hingeably connected at either end to the upturned ends of said skid member, inflatable resilient means designed to fill and be secured within the entire space between said top chord member and said skid member to transmit stress uniformly to all parts of said skid member, socket means carried by said top chord member for connecting to the stub axle and adjustable stay means connecting to the front and rear of said landing skid for controlling the trim thereof.

2. A landing skid for aircraft as defined in claim 1 comprising upright guiding means for said stub axle, said means comprising a substantially U-shaped member secured to said skid member, the upright sides whereof are formed with vertical slots through which extends said stud axle, said slots guiding said stub axle in the vertical plane, said stub axle being secured to said top chord member in the space between said vertical sides of said U-shaped member.

3. A landing skid for aircraft as defined in claim 1 in which said socket means is secured centrally to the top of said top chord member and said inflatable resilient means consists of an inflatable bag member designed to conform to the longitudinal sectional shape defined by said top chord member and said skid member, and having a substantially trapezoidal cross sectional shape.

VALANCE HEATH PATRIARCHE.

REFERENCES CITED

The following references are of record in the file of this patent:

UNITED STATES PATENTS

| Number | Name | Date |
|---|---|---|
| 1,317,741 | Turnbull | Oct. 7, 1919 |
| 1,622,719 | Hofmeister | Mar. 29, 1927 |
| 1,784,274 | Cotton | Dec. 9, 1930 |
| 2,350,130 | Rinkinen | May 30, 1944 |

FOREIGN PATENTS

| Number | Country | Date |
|---|---|---|
| 14,637 | France | Nov. 11, 1911 |
| | (Additional to No. 428,217) | |
| 433,722 | France | Nov. 3, 1911 |
| 540,589 | France | Apr. 30, 1922 |
| 381,655 | Germany | Sept. 22, 1923 |